United States Patent [19]

Denimal

[11] Patent Number: 4,638,354
[45] Date of Patent: Jan. 20, 1987

[54] RAPID PROFILE RECORDING DEVICE

[75] Inventor: Philippe Denimal, Pont-du-Chateau, France

[73] Assignee: PROGE, Paris, France

[21] Appl. No.: 703,710

[22] Filed: Feb. 21, 1985

[30] Foreign Application Priority Data

Feb. 23, 1984 [FR] France ................................ 84 02927

[51] Int. Cl.$^4$ .............................................. H04N 7/14
[52] U.S. Cl. .................................. 358/106; 358/209; 358/213
[58] Field of Search ................... 358/213, 212, 44, 48, 358/209, 106; 357/24 L R; 250/578, 211 J

[56] References Cited

U.S. PATENT DOCUMENTS

| | | | |
|---|---|---|---|
| 4,176,369 | 11/1979 | Nelson | 357/24 |
| 4,251,834 | 2/1981 | Hall | 358/213 |
| 4,322,752 | 3/1982 | Bixby . | |
| 4,369,468 | 1/1983 | Hall | 358/213 |
| 4,426,629 | 1/1984 | Fouse | 333/165 |
| 4,471,270 | 9/1984 | Guyot | 315/374 |
| 4,496,971 | 1/1985 | West | 358/106 |
| 4,506,299 | 3/1985 | Berger et al. | 358/213 |
| 4,575,751 | 3/1986 | Duschl | 358/106 |

OTHER PUBLICATIONS

"Schnelles Sortieren . . . CCD-Technologie", Murphy et al., Messen+Prufen/Automatik, No. 9, Sep. 1980, pp. 549, 550, 553, 554.

*Primary Examiner*—Robert G. Lev
*Attorney, Agent, or Firm*—Brumbaugh, Graves, Donohue & Raymond

[57] ABSTRACT

A profile recording device comprises a network of photosensitive image points. It is adapted to a reading in parallel of all the lines of image points and integrates means for processing (threshold comparators and memorization cells) the electric signals delivered in order to extract the observed profile therefrom.

12 Claims, 5 Drawing Figures

RAPID PROFILE RECORDING DEVICE

The present invention relates to the field of measurements employing optical means. More particularly, it concerns devices adapted to the recording of profiles using a video-type image as detected information, as well as the processing of said image.

In such measurement systems, it is more and more frequent to use a video camera as detector. The role of the camera is to transform an optical image characterized by a variation of brightness in space into an electric signal characterized by a corresponding variation of current in time. Most of the video cameras proposed up to the present time employ standard image formats, namely 625 lines and 40 msec per image in Europe and 525 lines and 33 msec per image in the USA and Japan.

Unfortunately, the use of video cameras for the measurement raises a number of problems related to geometric defects in the image obtained and the relatively long time for the acquisition of this image.

The use as photosensitive target of "solid state" detectors instead of detectors formed of a "vacuum tube" has already made it possible to eliminate the geometric distortions due to the scanning of the camera and the lag.

The photosensitive portion of these solid state detectors is formed by elementary image points (called "pixels" in English), produced on a single semiconductor substrate. The state of the art knows different ways of producing the photosensitive zone, on the one hand, as well as different systems for reading the charges which create the image, on the other hand.

In order to provide the speed of reading performance, it is known to free oneself of the customary image formats. One then comes against a technological limit, namely, the maximum frequency of reading of a network system of pixels, which is on the order of $10^7$ Hz. By way of example, when using a matrix of 200 lines of 250 pixels, the minimum reading time will be on the order of 5 msec. This therefore makes it possible to gain only a little less than one order of magnitude in speed of reading (5 msec instead of 40 msec). In the following description, there shall be used this matrix of 200×250 pixels as example, since the number of pixels defines either the field observed or the resolution of the optical sensor, which are data imposed by the specific application which is made of the sensor and are maintained constant in order to facilitate comparisons.

For many industrial applications, this time of 5 msec for the acquisition of an image is excessively long and prevents in practice the measurement by fixed observation of moving objects (kinetic blur).

One can gain in speed by using only one line rather than a matrix of pixels. The applications are limited to cases in which a linear image is sufficient. This does not permit the recording of images having two dimensions, and therefore profiles.

In order to increase the speed of acquisition of images formed on solid state detectors, it is also known to read several lines of pixels in parallel instead of scanning line by line in accordance with the most widespread technique (U.S. Pat. No. 4,322,752).

Let us take the example of a matrix formed of 200 lines of 250 pixels. Using a frequency on the order of $10^7$ Hz, which is considered maximum for the reading of pixels, one can read a line in 25 $\mu$sec. Now, in this case, all the lines are read in parallel. Without taking into account suppression times, one can therefore theoretically acquire one image every 25 $\mu$sec, namely 40,000 images per second. Since each pixel represents a minimum amount of information of 6 bits, which represents a maximum dynamic range of 64:1, the system should operate at 200×250 (pixels per image)×40,000 (images per second)×6 (bits per pixel)=12,000 megabits per second. One therefore comes against another impossibility of a technological nature, since such a density of data is clearly unusable. Therefore, one must successively read several groups of lines which are read simultaneously, for instance 20 groups of 10 lines, which, all other things being equal, decreases the amount of data to be transmitted per unit of time but correspondingly increases the reading time, which is multiplied by 20 (2,000 images per second or 500 $\mu$sec per image).

The object of the invention is to provide a device adapted to record a profile.

Another object of the invention is to provide such a device which permits the measurement of a profile by fixed observation of moving objects.

In accordance with another object of the invention, the profile recording device must have a rapidity such that, during one image reading time, the object observed has moved sufficiently little so that the precision of the measurement is not changed.

Another object of the invention is a video camera employing such a profile recording device.

The invention is based on the fact that when it is desired to record a profile, most of the data contained in a video image is superfluous. In practice, each line contains a single useful item of data, namely the position of the profile in the line. This position is recognized by identifying an interval of pixels in superbrightness or, in general, a change in brightness. The different ways of illuminating an object whose profile it is desired to measure are well known to the man skilled in the art (Cf. French Pat. No. 81-24418, for example) and are not described.

The profile recording device of the invention, which comprises a plurality of elementary photosensitive image points produced on the same semiconductor substrate in a matrix having M lines and P columns and adapted to accumulate electric charges in response to brightness information impinging thereon and representing collectively a profile to be recorded, and which also comprises, associated with each of the M lines, means for reading and transfer of the electric charges accumulated by the image points in order to provide an electric signal $V_j(t)$ which is a function of the electric charges, said means being organized for a reading in parallel of the M lines, is characterized by the fact that said device comprises, integrated on the same said semiconductor substrate, (a) at least one threshold comparator per line, responsive to the corresponding line electric signal $V_j(t)$, for providing an indication of a variation in the level of said signal, and at least one memorization cell per comparator, the position in space where said variation occurs being recorded in said memorization cell, thereby establishing M positions in space defining the profile to be recorded, and (b) means for reading said M positions in space.

The invention will be better understood by reference to the figures of the drawings, which show diagrammatically in nonlimitative manner, the operation of the integrated image acquisition and processing device of the invention.

In all the figures and in their description, the following system of notation is employed:

i represents the address of a pixel in a line, it varying from 1 to P;

j represents the address of a line of pixels in the matrix, it varying from 1 to M;

p is used for a particular value of the address i.

There is, to be sure, a bijective correspondence between the position in space of a pixel (of a line) and its address i (j).

Figure 1:
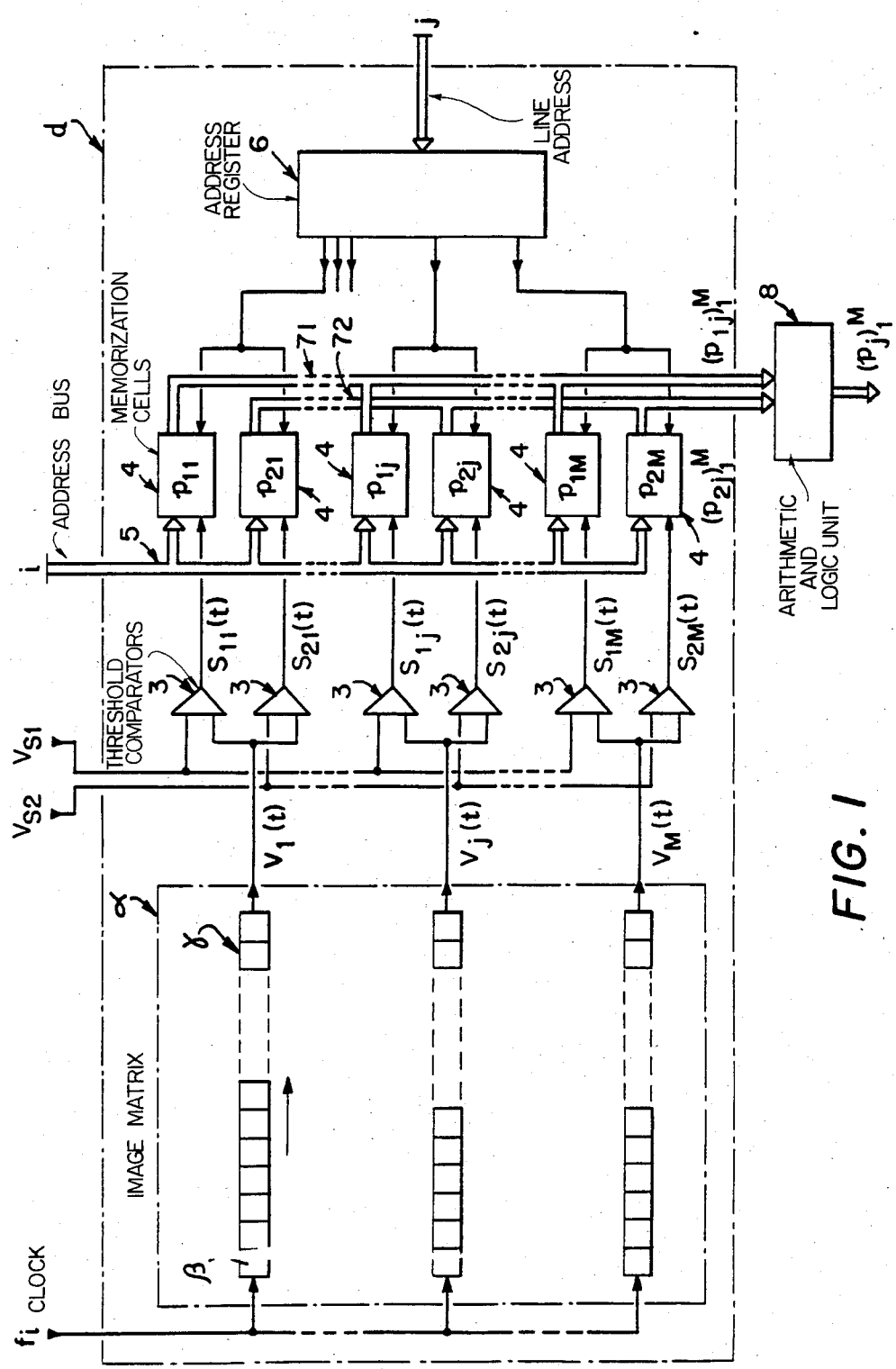
FIG. 1 is a synoptic diagram of the device according to the invention.

FIG. 1 shows the profile recording device d of the invention, comprising a matrix $\alpha$ of image points $\beta$ or pixels arranged in M lines $\gamma$ of p elements. The device described is adapted to the recording of a profile appearing in superbrightness. The brightness information falling on the matrix a which represents the profile of an object in space, is transformed into a proportional amount of electric charge by the pixels $\beta$. Each line of pixels is read sequentially by a known reading means. For example, a shift register of the CCD type ("Charge Coupled Device") receives in parallel the content of a line and delivers in series the electric signal $V_j(t)$ which is the result of the conversion of variation of brightness in space into variation of current in time. The line reading speed is piloted by a frequency clock $f_i$. All the lines $\beta$ are read simultaneously and deliver M signals $V_j(t)$. Each signal $V_j(t)$ is compared with a threshold voltage of the ascending fronts $V_{S1}$ and with a threshold voltage of the descending fronts $V_{S2}$ in two threshold comparators 3. The exceeded threshold signals $S_{1j}(t)$ and $S_{2j}(t)$ of the threshold voltages $V_{S1}$ and $V_{S2}$, respectively, act on the memorization cells for the position of the brightness signal ascending and descending fronts $V_j(t)$. In the following, 4 designates in general the memorization cells, whatever their constitution or position. In this variant, the memorizing is effected in digital form. The "bus" 5 (the customary English term to designate a transfer channel in a digital system) constantly communicates the address i of the pixel read to the memorization cells 4 which, for each line and at moments determined by the comparators 3, record the specific addresses (or positions in space) of the ascending fronts $P_{1j}$ and the descending fronts $P_{2j}$. After the acquisition and the immediate processing of the signal $V_j(t)$ simultaneously for the M lines, 2 M addresses corresponding to coordinates in space are in memory. The address register 6 selects the memorization cells 4 in succession by means of the line address j. The output signals delivered simultaneously by the output buses 71 and 72 are each formed by the sequence of addresses (or coordinates) of the ascending $(p_{1j})_1^M$ and descending $(p_{2j})_1^M$ fronts, respectively. With these data, an arithmetic and logic unit 8 calculates the coordinates of the profile $(p_j)_1^M$. Furthermore, the arithmetic and logic unit 8 can carry out other control operations (correlation, coherence of data) which make it possible to validate the restituted profile information.

The device described is designed to record a profile in superbrightness. More generally, a first comparator references a first threshold of the signal $V_j(t)$ to record the position in space of this first threshold, and a second comparator references a second threshold of said signal to record the position in space of said second threshold only when said first threshold has already been referenced. The amplitude of the threshold voltage is of no significance in order to determine the order of the said thresholds of the signal $V_j(t)$, this order being imposed upon the device.

Figure 2:
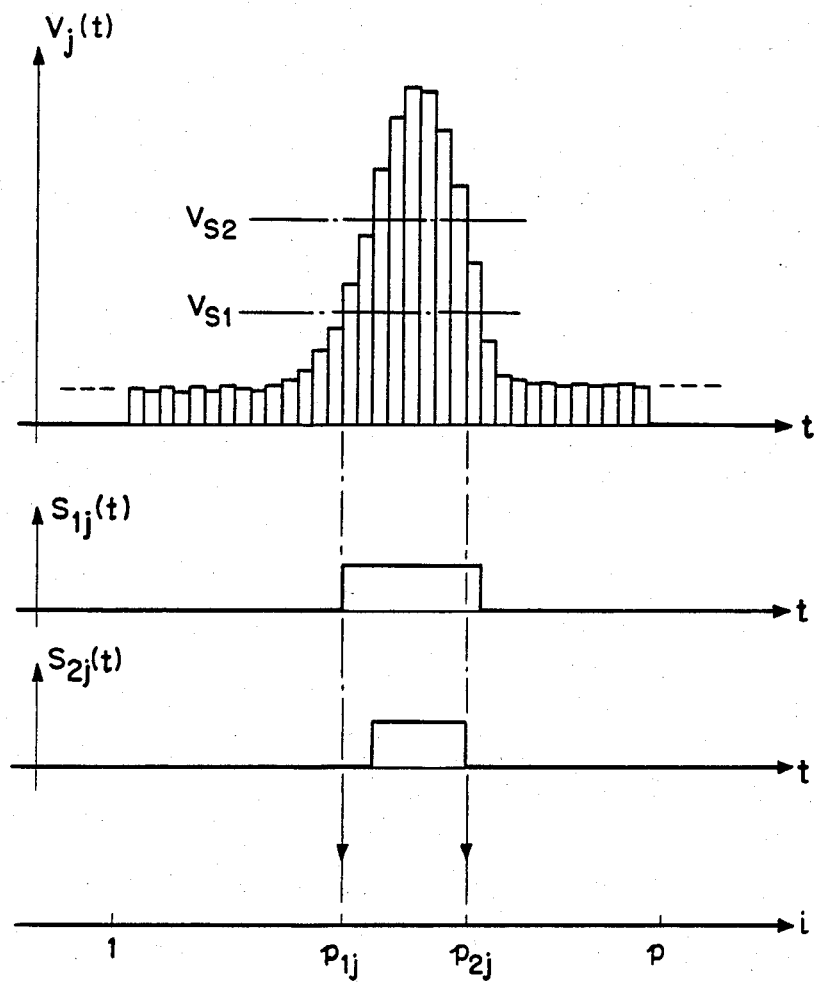
FIG. 2 is a chronogram representing the main electric signals during the marking of the position of the profile in a line.

FIG. 2 shows, for the device described, the main electric signals during the phase of acquisition of the "profile" information. The signal $V_j(t)$ delivered by the line j is compared at the reference levels $V_{S1}$ and $V_{S2}$. There result from this the exceeded threshold signals $S_{1j}(t)$ and $S_{2j}(t)$ which make it possible to memorize the addresses $P_{1j}$ and $P_{2j}$.

The "profile" information sought is contained in these 2 M memorized addresses. The acquisition time of this information is equal to the acquisition time of one line, namely 25 $\mu$sec for a line of 250 pixels. The complete cycle comprises the acquisition of the "profile" information and the restitution of the memorized information.

The restitution is effected by simultaneously reading the two groups of memories (groups of positions of the ascending fronts and group of positions of the descending fronts). By adopting the same reading frequency ($10^7$ Hz), one obtains the restitution of the profile in 20 $\mu$sec for 200 lines. The total time of the cycle is therefore theoretically equal to 45 $\mu$sec, namely, on the order of 50 $\mu$sec or 20,000 images per second. We may note that the speed of reading in the memorization cells 4 of RAM memory type may be much higher. Since $2^8=256$, the addresses i are 8-bit addresses and the output buses 71 and 72 are two 8-bit buses.

The profile is digitalized in the form of a 16-bit word. The device operates at 16 (bits per line)$\times$200 (lines per image)$\times$20,000 (images per second)=64 megabits per second, which corresponds to a gain of 3 orders of magnitude as compared with the known comparable devices. There is no difficulty in processing this information in real time in a discrete electronic system associated with the device according to the invention.

The amount of information restituted by the device is very small but nevertheless contains all the desired "profile" information. The cycle time is proportional to the algebraic sum P+M instead of being proportional to the product P$\times$M. It can therefore be noted that the device of the invention makes it possible to solve the problem of the rapid recording and measurement of a profile.

Figure 3:
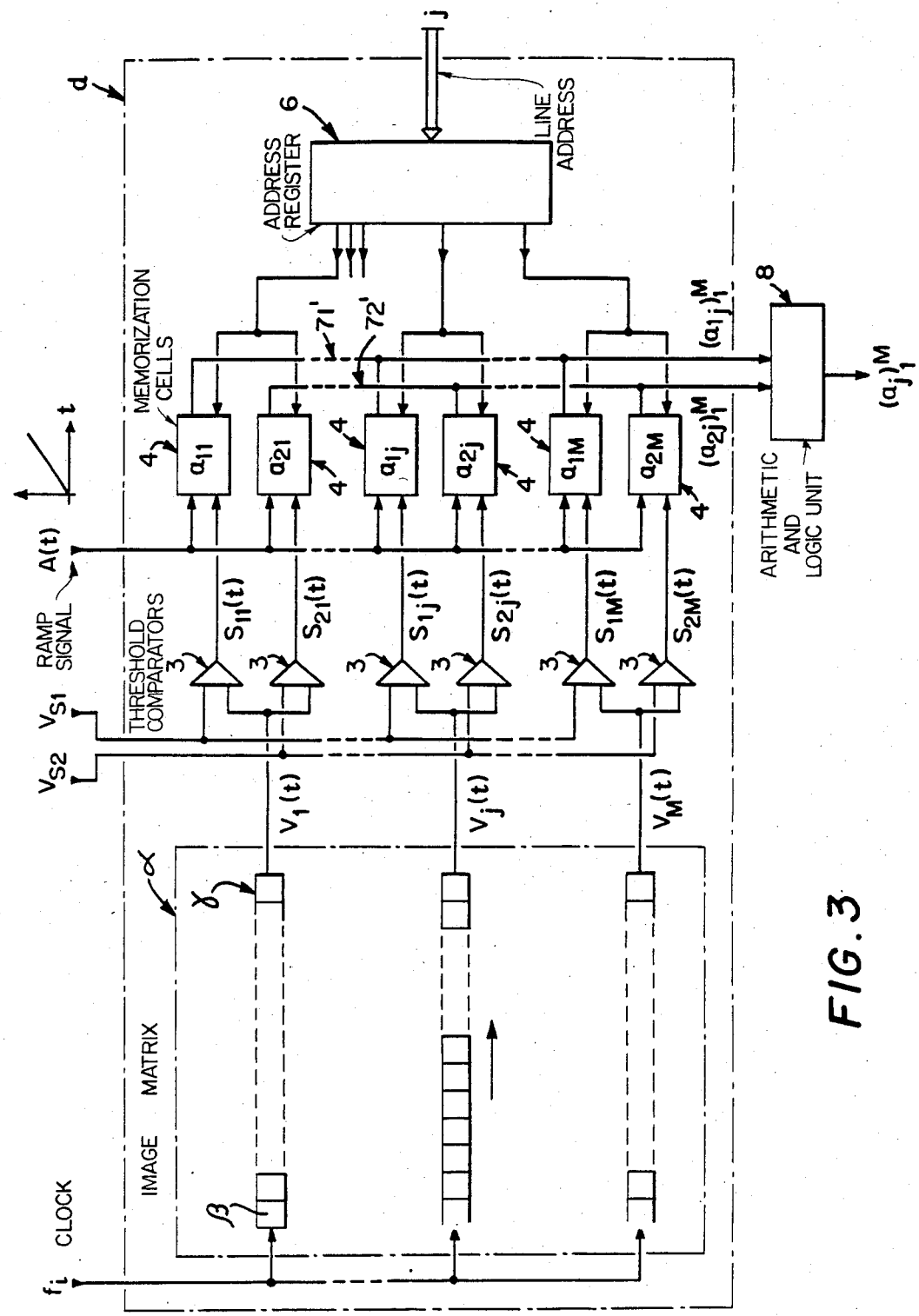
FIG. 3 is a synoptic diagram of a variant embodiment of the invention.

FIG. 3 is a synoptic diagram of a variant embodiment of the device of the invention in which the memorization of the "profile" information is effected by analog means. Each position in space i of a pixel corresponds to a given level of the ramp signal A(t). This ramp is applied to all the memorization cells 4 formed of sampler-blocker systems, in a manner coordinated with the reading in parallel of the M lines. At the moments determined by the comparators 3, the instantaneous values of the signal A(t) memorize the position $a_{1j}$ of the ascending front and $a_{2j}$ of the descending front. The reading of the memorization cells is effected as previously, namely, in succession in each pair of memories 4 for the addresses j varying from 1 to M. The lines 71' and 72' restitute the analog signals $a_{1(j)}$ and $a_{2(j)}$ which, by calculation, give the desired profile $a(j)$.

Figure 4:
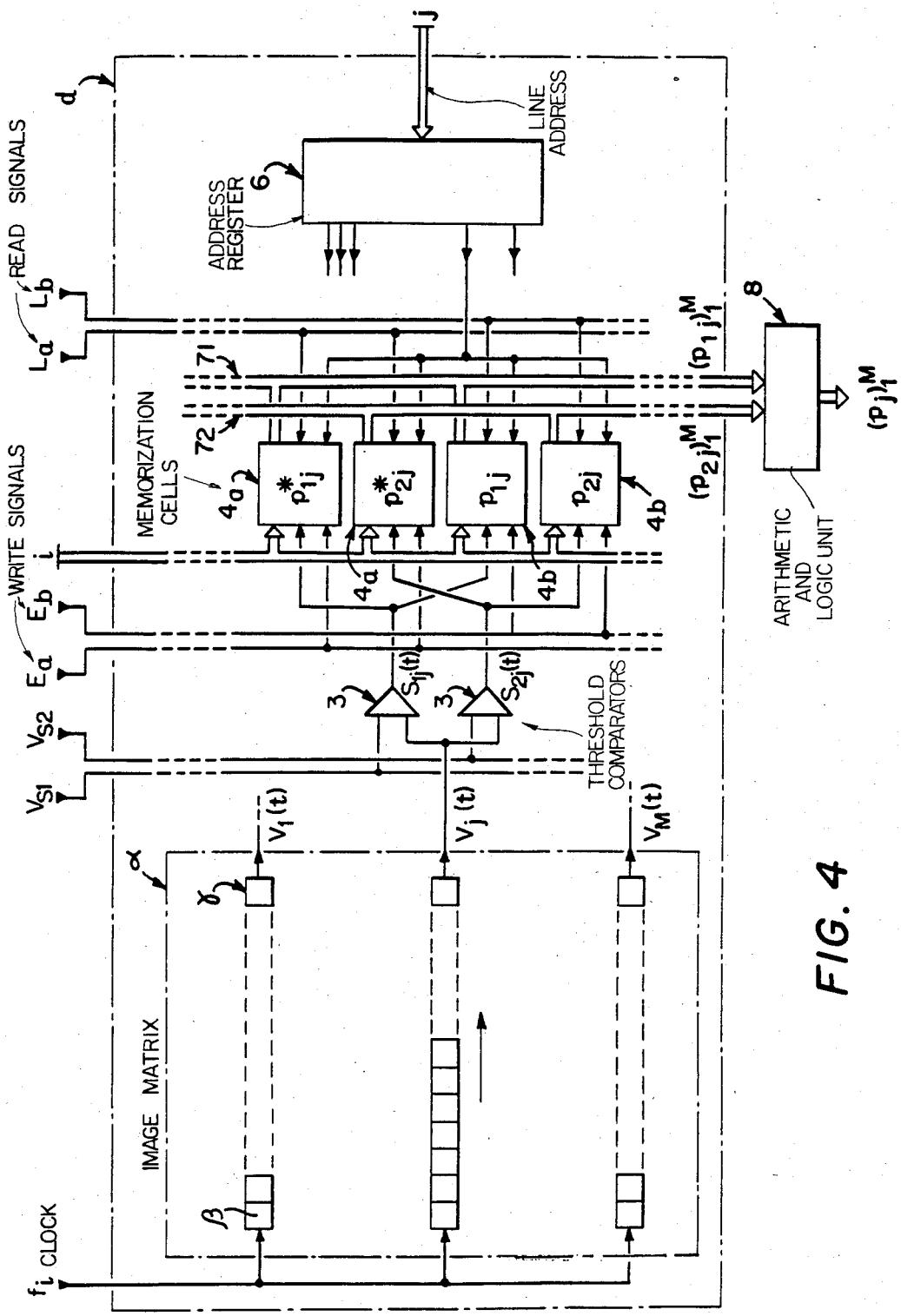
FIG. 4 is a synoptic diagram of a third variant embodiment of the invention.

FIG. 4 is a synoptic diagram of a third variant embodiment of the device according to the invention in which, in order to decrease the cycle time while retaining the same image acquisition speed, two groups of memorization cells 4a and 4b are provided which operate in shared time. The device shown schematically operates in the following manner:

for one cycle, the addresses of the profile $P_{1j}$ are identified as in the first example; they can be memorized only in the memorization cells 4b due to the writing validation signal $E_b$ and the absence of writing validation signal $E_a$;

during the same cycle, the addresses of the preceding profile $p_{1j}*$ and $p_{2j}*$ (memorized in the preceding cycle) are read in the memory cells 4a due to the reading validation signal $L_a$ and the absence of reading validation signal $L_b$;

during the following cycle, the writing is effected in the memory group 4a and the reading in the group 4b, and so on.

The writing operation (acquisition and processing of the profile) and reading operation (restitution of the profile) being simultaneous, the complete cycle time is here determined by the longer of the acquisition and restitution times. In practice, this is always the acquisition time. The cycle time is proportional to P and the amount of information transmitted reaches in our example 128 megabits per second, a value which can easily be used.

Figure 5:
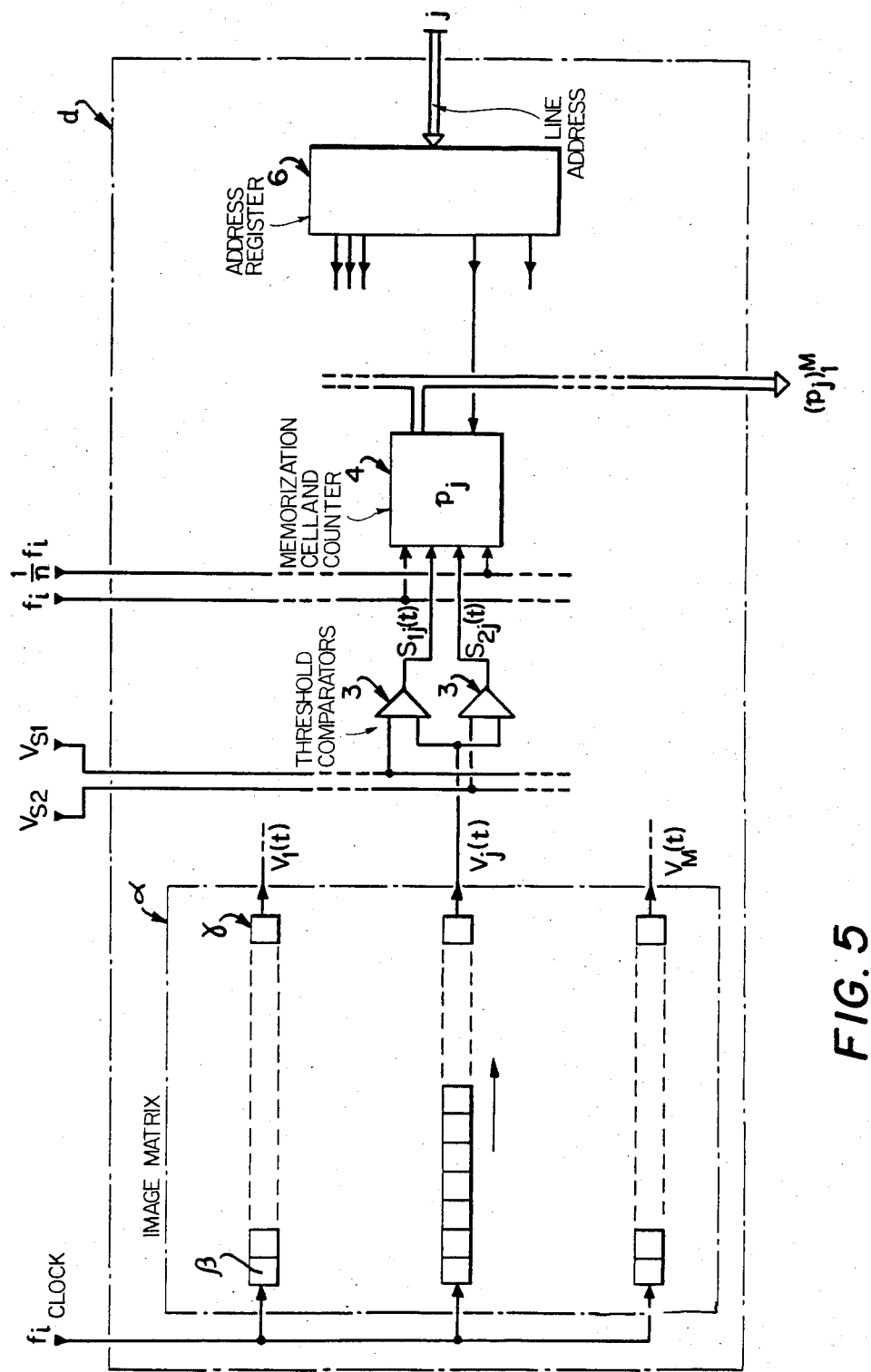
FIG. 5 is a synoptic diagram of a fourth variant embodiment of the invention.

The fourth variant embodiment described in FIG. 5 is a profile recording device d which integrates the calculation of the profile in the device. This variant limits the field of verifications which are possible on the profile delivered, but it may be sufficient. The memorization cell 4 in this case has a counter. As long as $V_j(t)$ has not reached the threshold $V_{S1}$, frequency pulses $f_i$ are counted. When the threshold $V_{S1}$ is exceeded and as long as $V_j(t)$ has not reached the threshold $V_{S2}$, frequency pulses $1/n\ f_i$ are counted. When $V_j(t)$ has exceeded the threshold $V_{S2}$, the counter is blocked at the value acquired, namely, the address of the recorded profile $p_j = p_{1j} + 1n\ (p_{2j} - p_{1j})$. The frequency of the pulses counted may be different from that of the reading of the pixels, provided that their ratio is known. The other parts of the device are identical to those of the first example.

Other variants of the device of the invention can be developed using only a single threshold voltage to mark the ascending fronts and the descending fronts. In this case, the device may contain only a single threshold comparator per line.

The examples described refer to the case in which the profile appears in superbrightness. It is clear that all the variants of the device according to the invention can also mark a profile appearing in silhouette. In this case, the "profile" information is contained in a variation of brightness level and will be given by a single address per line. A device with a single threshold voltage and a single comparator per line is sufficient.

The invention extends to all variants of the profile recording device described, in particular devices having more than two comparators per line, more than two memorization cells per comparator, or more than two output channels, provided that special means are provided to fulfill the functions set forth and to result in the recording and measurement of a profile. It also extends to video cameras provided with such a profile recording device.

What is claimed is:

1. A profile recording device comprising a plurality of elementary photosensitive image points produced on the same semiconductor substrate in a matrix having M lines and P columns and adapted to accumulate electric charges in response to brightness information impinging thereon and representing collectively a profile to be recorded, and also comprising, associated with each of the M lines, means for reading and transfer of the electric charges accumulated by the image points in order to provide an electric signal $V_j(t)$ for each line which is a function of the electric charges, said means being organized for a reading in parallel of the M lines, characterized by the fact that said device comprises, integrated on the same said semiconductor substrate, (a) at least one threshold comparator per line responsive to the corresponding electric line signal $V_j(t)$ for providing an indication of a variation of the level of said electrical signal, at least one memorization cell per comparator, means for recording in said respective memorization cells the positions in space where each of said variations in level occurs, thereby establishing M positions in space representing the profile; and (b) means for the reading of said M positions in space.

2. A device according to claim 1, characterized by the fact that the reading of the image-point lines is effected by a shift register which receives in parallel the electric charge contained in a photosensitive line and delivers in series the electric signal $V_j(t)$ which is the result of the conversion of variation of brightness in space into variation of current in time.

3. A device according to claim 1, characterized by the fact that the means for the reading of said M memorized positions in space comprise an address register which selects one or more memorization cells corresponding to the line address j requested in order to restitute the memorized positions in space via one or more output channels.

4. A device according to claim 1, characterized by the fact it comprises two comparators per line, each comparator being associated with at least one memorization cell, one comparator marking a first threshold of said electric signal $V_j(t)$ and the other comparator marking a second threshold of said electric signal $V_j(t)$, the position $P_{1j}$ in space of said first threshold being recorded by a memorization cell and the position $P_{2j}$ in space of said second threshold being recorded by a memorization cell.

5. A device according to claim 1 or 2, characterized by the fact that the means for the reading of said M memorized positions in space comprise an address register which selects one or more memorization cells corresponding to the line address j requested in order to restitute the memorized positions in space via a first output channel which delivers the positions $P_{1j}$ of the first threshold and a second output channel which delivers the positions $P_{2j}$ of the second threshold.

6. A device according to claim 3, characterized by the fact that it comprises only one memorization cell per comparator so that the complete profile recording cycle comprises the following two successive phases: memorization of said positions in space and then reading of said memorized positions in space.

7. A device according to claim 3, characterized by the fact that it comprises two memorization cells per comparator so that the complete profile recording cycle comprises the simultaneous phases of memorizing the said positions in space and of reading the positions in space memorized during the preceding cycle.

8. A device according to claim 1 or 2, characterized by the fact that it integrates profile calculation means from the "position of profile" information extracted.

9. A device according to claim 8, characterized by the fact that it comprises two threshold comparators and a memorization cell comprising a counter per line, the first threshold comparator marking a first threshold of the electric signal $V_j(t)$ and the other a second threshold, the counter operating in accordance with a first mode until the first threshold comparator reaches the first threshold and then according to another mode until the second threshold comparator reaches the second threshold, then retaining the value acquired, said value being the calculated "position of profile" information.

10. A device according to claim 9, characterized by the fact that the means for reading said "position of profile information" memorized by the counters comprise an address register which selects the memorization cell corresponding to the address j of the line requested.

11. A device according to claim 3, characterized by the fact that the selection of the addresses j is sequential.

12. A video camera comprising a device according to claim 1.

* * * * *